United States Patent [19]

Stein

[11] 3,892,984

[45] July 1, 1975

[54] REGENERATING CIRCUIT IN THE FORM OF A KEYED FLIP-FLOP

[75] Inventor: Karl-Ulrich Stein, Munich, Germany

[73] Assignee: Siemens Aktiengesellschaft, Berlin & Munich, Germany

[22] Filed: Feb. 13, 1974

[21] Appl. No.: 442,084

[30] Foreign Application Priority Data

Feb. 23, 1973 Germany ............................ 2309192

[52] U.S. Cl. ................ 307/279; 307/238; 307/291; 340/173 FF; 340/173 CA

[51] Int. Cl....... H03k 3/286; H03k 3/33; G11c 7/00

[58] Field of Search ........... 307/238, 246, 279, 291; 328/200, 206; 340/173 FF, 173 SP, 173 CA

[56] References Cited

UNITED STATES PATENTS

| | | | |
|---|---|---|---|
| 3,514,765 | 5/1970 | Christensen | 307/279 X |
| 3,588,844 | 6/1971 | Christensen | 307/238 X |
| 3,588,846 | 6/1971 | Linton et al. | 307/279 X |
| 3,609,710 | 9/1971 | Browne | 307/279 X |
| 3,678,473 | 7/1972 | Wahlstrom | 307/238 X |
| 3,685,027 | 8/1972 | Allen | 307/238 X |
| 3,771,148 | 11/1973 | Aneshansley | 307/279 X |
| 3,774,176 | 11/1973 | Stein et al. | 307/279 X |
| 3,798,621 | 3/1974 | Baitinger et al. | 307/238 X |

*Primary Examiner*—Michael J. Lynch
*Assistant Examiner*—L. N. Anagnos
*Attorney, Agent, or Firm*—Hill, Gross, Simpson, Van Santen, Steadman, Chiara & Simpson

[57] ABSTRACT

A regenerating circuit in the form of a keyed flip-flop for binary signals, in particular for readout signals of integrated single-transistor storage elements forming a storage field in which the single transistor storage elements of the storage field are connected over a digit line to the flip-flop circuit, with the regenerating circuit comprising at least two inverting amplifier stages having feedback, at least one barrier transistor being disposed at the signal input between the associated digit line and the corresponding amplifier stage, and in which means are provided for effecting a discontinuance of the feedback function as well as means for providing a bias potential at the inputs of the regenerating circuit.

7 Claims, 3 Drawing Figures

REGENERATING CIRCUIT IN THE FORM OF A KEYED FLIP-FLOP

BACKGROUND OF THE INVENTION

1. Field of the Invention

The invention is directed to a regenerating circuit in the form of a keyed flip-flop for binary signals, in particular for the readout signals of integrated single-transistor storage elements forming a storage field, in which the single-transistor storage elements are connected to the flip-flop over a digit line.

2. The Prior Art

Regenerating flip-flops for storage arrangements of the above-mentioned type are known. For example, a regenerating flip-flop circuit of this type is described in earlier patent application P 21 48 896.0–53, U.S. Pat. No. 3,774,176 in which the single-transistor storage elements of a storage field are connected over a common digit line to the regenerating flip-flop. Upon readout of the stored data, there is a compensation of charge between the capacitance of a single-transistor storage element on the one hand and the capacitance of the digit line and input capacitance of the flip-flop on the other hand, which leads to a change of potential corresponding to the readout data on the digit line.

BRIEF SUMMARY OF THE INVENTION

The invention has among its objects the provision of a regenerating circuit for a storage arrangement such as described, by means of which losses caused by the capacitance of the digit line and the flip-flop are avoided. This objective is realized in a regenerating circuit such as described, in which the regenerating circuit comprises at least two inverting amplifier stages with feedback at least one barrier transistor at the signal input between the digit line and the associated amplifier stage, responsible for eliminating the charge sharing between the storage cell and the digit line as well as a provision for the discontinuation of the feedback function and means for setting up a bias potential at the inputs of the regenerating circuit.

In accordance with the invention, by means of the barrier transistor, before the commencement of the readout cycle, the digit line is pre-charged to a specific potential, whereby the barrier transistor represents a potential barrier, and on readout, in dependence upon the nature of the charge pulse which is passed from a storage element of the storage field to the digit line, the potential at one of the inverting feedback amplifier stages is retained or reduced. For reference see 1972 ISSCC Digest of Technical Papers, p. 18, 19, and 209 and U.S. Pat. No. 3,774,176.

BRIEF DESCRIPTION OF THE DRAWINGS

In the drawings wherein like referenced characters indicate like or corresponding parts.

DETAILED DESCRIPTION OF THE INVENTION

Figure 1:
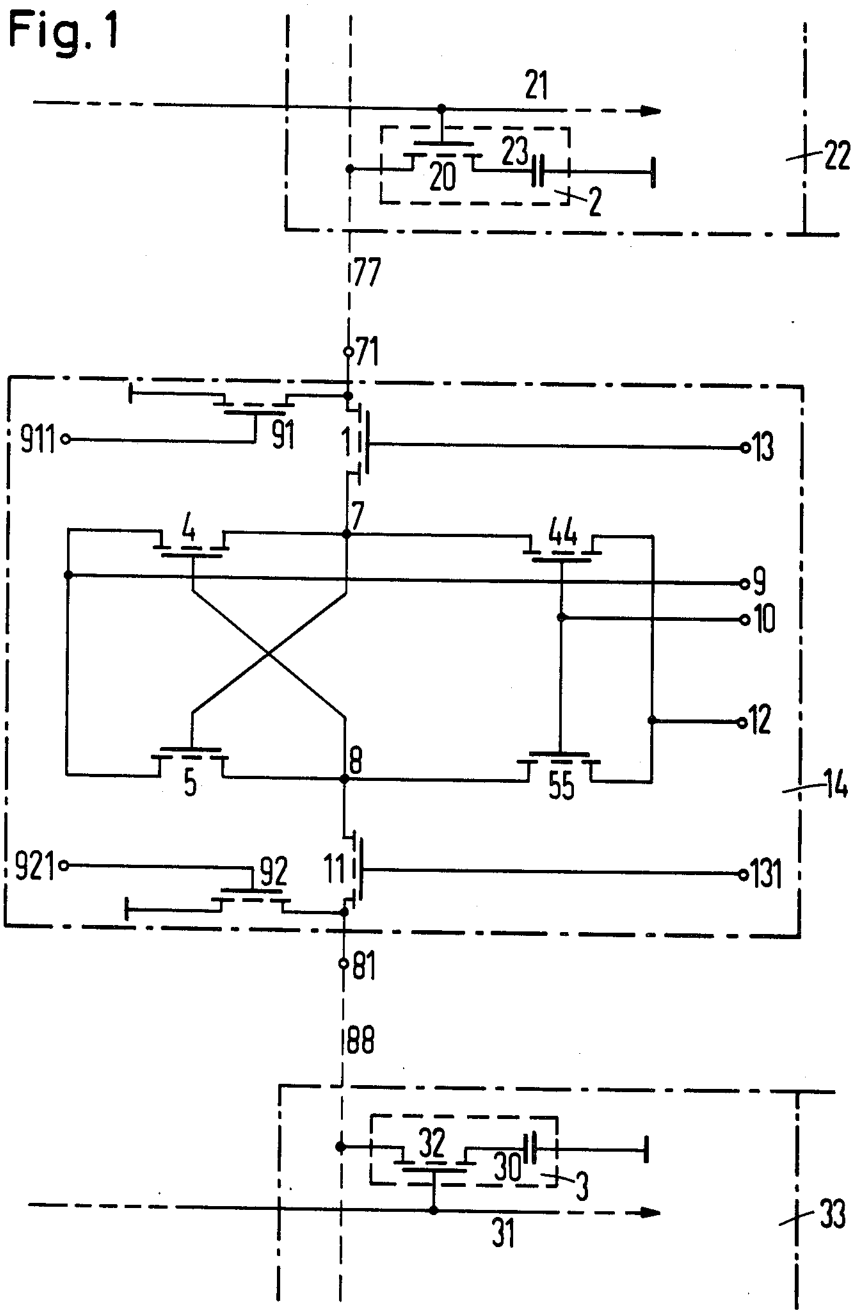
FIG. 1 is a schematic diagram of a regenerating circuit, in accordance with the invention, which is connected to the digit lines of two storage fields.

Referring to FIG. 1, the regenerating circuit designated generally by the reference numeral 14, is operatively connected at points 71 and 81, respectively, to corresponding digit lines 77 and 88 which extend to respective storage fields 22 and 23, each of which comprises a number of single-transistor storage elements. In the figure, one single-transistor storage element 2 is illustrated as comprising a transistor 20 and a capacitor 23 which forms a part of the storage field 22, and in like manner, a storage element 3 is illustrated in the storage field 33 and comprises a single-transistor 32 and cooperable capacitor 30. The gate of the transistor 20 is connected by a wordline 21 to a decoder, not illustrated in the drawing, and in like manner, the gate of the transistor 32 is connected over a wordline 31 to a similar decoder, not illustrated. The recorded signal is stored in the respective storage elements in the form of a charge on the associated capacitor of the storage element.

The previously referred to patent application describes in detail the manner in which individual storage elements of the storage fields are operated by means of decoders, and the operation of the flip-flop in a symmetric storage array with compensating (dummy) storage cells.

During the readout, the transistor, for example the transistor 20 of the storage element 2 of the storage field 32, is operated and switched to conductive. The charge storage in the capacitor 23 in prior art circuit arrangements was distributed among the capacitance of the transistor of the storage elements, as well as the circuit capacitance of the digit line and that of the regenerating flip-flop.

A regenerating circuit 14, in accordance with the invention, as shown in FIG. 1, preferably consists of two inverting amplifier stages, employing feedback, which are each composed of a transistor 4, 5 and an associated cooperable load element 44, 55, barrier transistors 1, 11 being disposed at the signal input 71, 81 of the devices 91, 92 for setting up a bias potential at the inputs of the regenerating circuit. The terminal 9 is provided over which the feedback function may be discontinued. The respective devices preferably consist of field effect transistors.

The manner of operation of the regenerating circuit according to the invention, as illustrated in FIG. 1, will be described in conjunction with FIG. 2.

Prior to commencement of the readout operation, the flip-flop disposed between the points 7 and 8 of the regenerating circuit is in the "on" state, i.e. when n-channel field effect transistors are employed, there is +10V at the input 10, OV at the input 9, and +10V at the input 12. Prior to the beginning of the readout cycle, the transistors 91 and 92 are blocked, i.e. OV is present at the inputs 911 and 921. At time *t*1, the feedback is discontinued by means of the provisions for the elimination of the feedback function, which may comprise the input 9, to which preferably +10V is applied at the time *t*1. At this point, terminal 9 and terminal 10 carry the same potential with +10V also being connected to terminal 12. In the following time period, the nodes 7 and 8 of the flip-flop are charged to the same, relatively high potential of +10V $-U_T$, wherein $U_T$ is the threshold voltage of the transistor. At the time t3, the flip-flop is switched into the "off" state, which is accomplished by applying OV to the terminal 10.

During the time interval between $t1$ and $t3$, by means of devices 91, 92 for setting up a bias potential, the digit line preferably is initially precharged to the potential OV. At this point in time, as illustrated in FIG. 2, for example in the interval between $t1$ and $t2$, a positive potential, preferably +10V, is applied to the gate terminals 911 and 921 of the transistors 91 and 92. The transistors 91 and 92 are thereby switched to a conductive state in the interval of time between $t1$ and $t2$, with the potential of OV thereby being applied to the digit lines 77, 88. When the transistors 91 and 92 are again rendered nonconductive at time $t2$, the digit line will be charged to a specific predetermined potential, since the transistors 1 and 11 have been rendered conductive since time $t1$, as a result of the connection of a potential to the gate terminals 13 and 131. The potential which appears on the digit lines 77 and 88 amounts to $U13 - U_T$ and $U131 - U_T$, respectively, in which $U_T$ is the start voltage of the transistors 1 and 11, and U13 and U131 is the potential prevailing at the inputs 13 and 131, respectively.

At the time t4, the charge of a storage element of the storage field 22 and 33 may pass as mentioned in U.S. Pat. No. 3,774,176 to the digit lines 77 and 88, respectively, and in dependence upon the sign of such charge, i.e. in dependence upon whether the data "O" or "1" reaches the digit line 77, 88, the existing potential on the digit line is increased or reduced. In the event that the potential is increased, i.e. in the given example the potential becomes more positive, such potential remains on the digit lines 77 and 88 since the barrier transistors 1 and 11 remain nonconductive. In the event that a negative charge is supplied to the digit lines 77, or 88, the potential prevailing on the digit line is temporarily reduced, since the barrier transistor 1, 11 temporarily becomes conductive. In accordance with the invention, a charge now flows from the point 7 to the point 8 across the transistors 1, 11 until the originally given potential is again reached on the digit line 77, 88. This causes the potential of preferably 10V at the nodes 7 and 8 to be reduced.

In accordance with the invention, in dependence upon the sign of the charge flowing to the digit lines 77, 88, as described above, a specific potential is set up across the nodes 7 and 8. If the potential on the digit line is increased, the potential prevailing across the nodes 7, 8 is retained, while if the potential is reduced, the potential at the nodes 7, 8 likewise is reduced. Next, at the time $t5$, the flip-flop is again switched into its "on" state, for which purpose the potentials originally appearing at the inputs 9 and 10 prior to the time $t1$, are reconnected. The flip-flop of the regenerating circuit now lies in one of its stable operating points in dependence upon the data which is derived over the digit lines 77, 88. At time $t6$, the transistor 1, 11 again become non-conductive.

Figure 3:
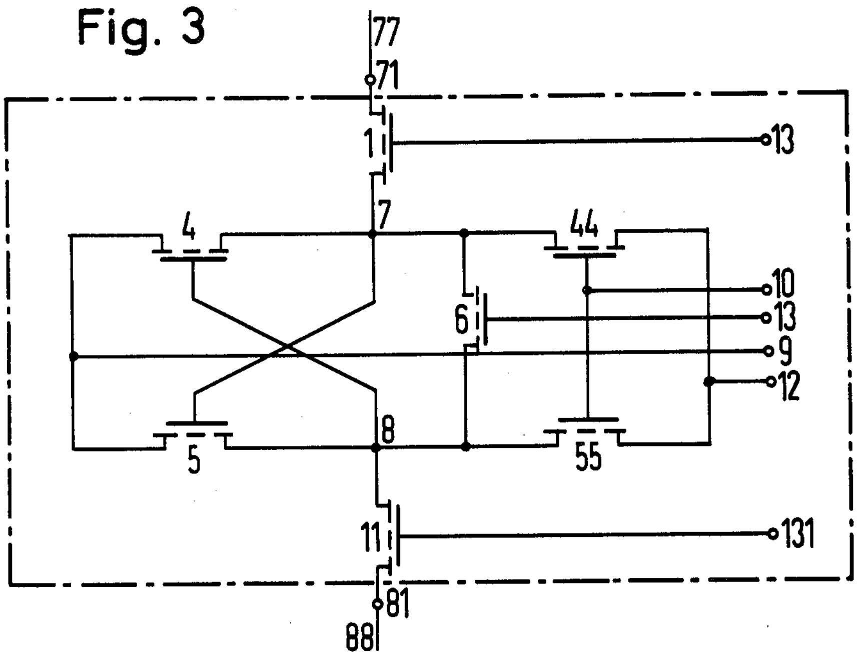
FIG. 3 is a schematic diagram illustrating a further development of a regenerating circuit in accordance with the invention.

In a further development of a regenerating circuit in accordance with the present invention, as illustrated in FIG. 3, the provision for discontinuance of the feedback function preferably comprises a field effect transistor 6. Assuming that $n$-channel field effect transistors are employed, the feedback function is discontinued by applying a potential of preferably OV to the input 10. The input 12 receives +10V and initially +10V appears at the input 13.

As a result, the transistor 6 is conductive, which results in a potential on the order of the start voltage $U_T$ of the field effect transistors 44 and 55 being applied to the nodes 7 and 8 of the flip-flop. In the exemplary embodiment illustrated, such transistors represent the device for setting up a bias potential at points 7, 8 and 71, 88. This results in the potential of $U_T$ also being applied to the points 71 and 88 as the transistors 1 and 11 are also conductive and function as explained in the above mentioned reference. The digit line 77, 88 is thereby precharged to a relatively low potential. All of the other operations take place in accordance with the description pertaining to FIGS. 1 and 2.

The regenerating circuit illustrated in FIG. 3 can also be operated in such a manner that in order to set up a bias potential at the points 7, 8 and 71, 81, the input 10 is preferably connected to +10V and the input 12 is temporarily connected to OV, while at the same time the input 9 is also temporarily connected to preferably +10V. There is then temporarily applied to the points 7, 8 and 71, 81 a potential of OV.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. A regenerating circuit in the form of a keyed flip-flop for binary signals, in particular for the readout signals of integrated single-transistor storage elements forming a storage field in which the single-transistor storage elements are connected over a digit line to the flip-flop, characterized in that the regenerating circuit comprises at least two inverting amplifier stages with feedback, at least one barrier transistor disposed at the signal input between the associated digit line and the corresponding amplifier stage, means for selectively effecting a discontinuance of the feedback function and means for selectively adjusting bias potentials at the inputs of the regenerating circuit.

2. A regenerating circuit according to claim 1, wherein the means for discontinuing the feedback function comprises a voltage supply input operatively connected to the amplifier stages for selectively supplying operating voltage thereto.

3. A regenerating circuit according to claim 1, wherein the means for providing bias potentials at the several inputs of the amplifier stages comprises respective load transistors for the amplifier stages, the load transistors being selectively controlled over a corresponding input of the regenerating circuit, whereby a relatively high bias may be supplied.

4. A regenerating circuit according to claim 3, wherein the means for discontinuing the feedback function comprises a voltage supply input operatively connected to the amplifier stages for selectively supplying operating voltage thereto.

5. A regenerating circuit according to claim 1, wherein the means for providing bias potentials at the signal inputs of the regenerating circuit comprise respective transistors controllable over corresponding inputs, whereby a relatively low bias may be supplied.

6. A regenerating circuit according to claim 5, wherein the means for discontinuing the feedback function comprises a voltage supply input operatively connected to the amplifier stages for selectively supplying operating voltage thereto.

7. A regenerating circuit according to claim 1, wherein the means for discontinuing the feedback and for providing a bias potential comprises a field effect transistor having its source and drain terminals connected to the nodes of the regenerating circuit and controlled over a corresponding input.

* * * * *

REEXAMINATION CERTIFICATE (102nd)

United States Patent [19]

Stein

[11] B1 3,892,984

[45] Certificate Issued Jul. 5, 1983

[54] REGENERATING CIRCUIT IN THE FORM OF A KEYED FLIP-FLOP

[75] Inventor: Karl-Ulrich Stein, Munich, Fed. Rep. of Germany

[73] Assignee: Siemens Aktiengesellschaft, Berlin & Munich, Fed. Rep. of Germany

Reexamination Request

No. 90/000,124, Dec. 14, 1981

Reexamination Certificate for:

Patent No.: 3,892,984
Issued: Jul. 1, 1975
Appl. No.: 442,084
Filed: Feb. 13, 1974

[30] Foreign Application Priority Data

Feb. 23, 1973 Fed. Rep. of Germany .. 2309192

[51] Int. Cl.³ .................... H03K 5/24; H03K 3/356; G11C 7/06

[52] U.S. Cl. ............... 307/530; 307/279; 307/291; 365/205

[58] Field of Search ................ 307/530, Dig. 3, 279; 307/291, 355, 262; 365/203, 205

[56] References Cited

U.S. PATENT DOCUMENTS

| | | | |
|---|---|---|---|
| 3,514,765 | 5/1970 | Christensen | 307/530 |
| 3,588,537 | 6/1971 | Brink | 307/530 X |
| 3,588,844 | 6/1971 | Christensen | 307/530 X |
| 3,678,473 | 7/1972 | Wahlstrom | 365/205 X |
| 3,760,381 | 9/1973 | Yao | 307/530 X |
| 3,771,148 | 11/1973 | Aneshansley | 307/279 X |
| 3,774,176 | 11/1973 | Stein et al. | 307/530 X |

OTHER PUBLICATIONS

Engeler et al., IEEE Journal of Solid-State Circuits (JSSC), vol. SC-7, No. 5, pp. 330–335; 10/1972.

Engeler et al., IEEE International Solid-State Circuits Conference (ISSCC), Digest of Technical Papers, pp. 18–19, 209, SESS: 1, "MEMORY"; 2/16/1972.

Stein et al., IEEE JSSC, vol. SC-7, No. 5, pp. 336–340; 10/1972.

*Primary Examiner*—L. N. Anagnos

[57] ABSTRACT

A regenerating circuit in the form of a keyed flip-flop for binary signals, in particular for readout signals of integrated single-transistor storage elements forming a storage field in which the single transistor storage elements of the storage field are connected over a digit line to the flip-flop circuit, with the regenerating circuit comprising at least two inverting amplifier stages having feedback, at least one barrier transistor being disposed at the signal input between the associated digit line and the corresponding amplifier stage, and in which means are provided for effecting a discontinuance of the feedback function as well as means for providing a bias potential at the inputs of the regenerating circuit.

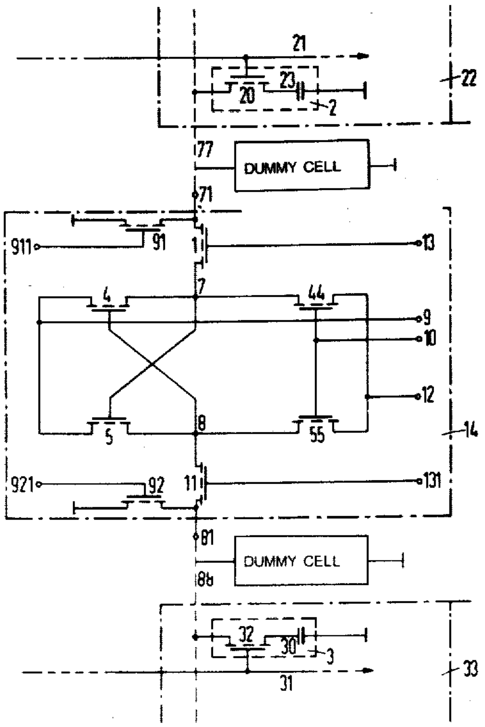

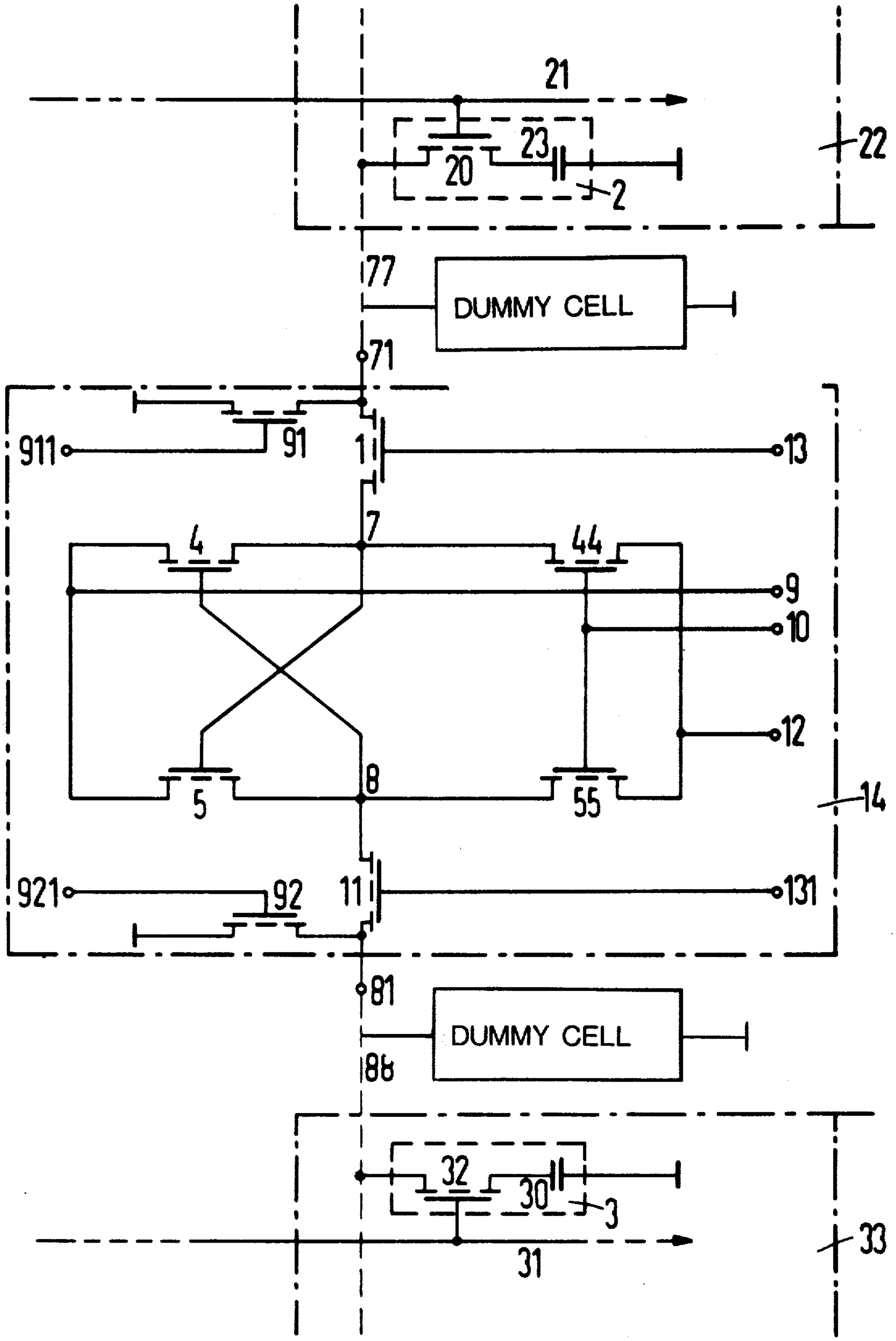
DUMMY CELL
DUMMY CELL

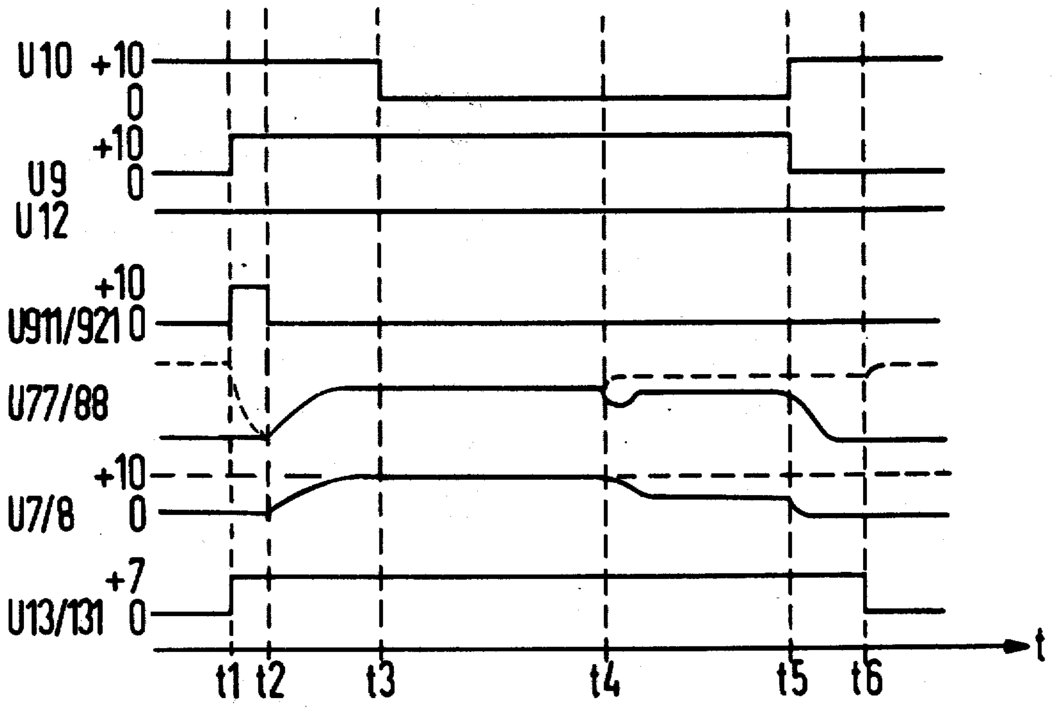
U10
+10
0
+10
U9
0
U12
+10
U911/921
0
U77/88
+10
U7/8
0
+7
U13/131
0
t
t1
t2
t3
t4
t5
t6

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

Figure 2:
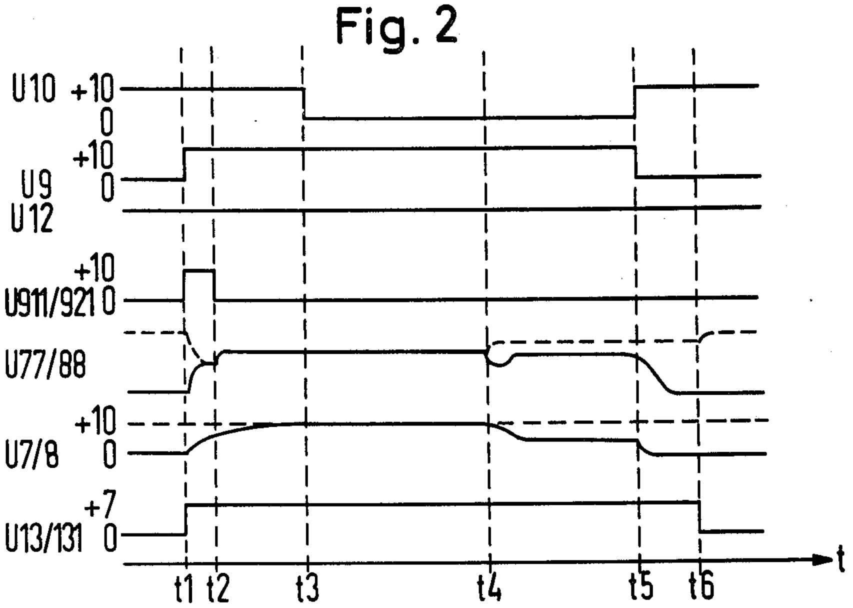
FIG. 2 is a chart illustrating the time sequence of the pulses lying various inputs of the regenerating circuit prior to, during, and subsequent to readout.

The attached drawing figures have been amended by adding in FIG. 1 the "dummy cells" and in FIG. 2 by changes in the solid and dashed lines opposite "U77/88".

ONLY THOSE PARAGRAPHS OF THE SPECIFICATION AFFECTED BY AMENDMENT ARE PRINTED HEREIN.

AS A RESULT OF REEXAMINATION, IT HAS BEEN DETERMINED THAT:

Column 2, lines 3–21.

Referring to FIG. 1, the regenerating circuit designated generally by the reference numeral 14, is operatively connected at points 71 and 81, respectively, to corresponding digit lines 77 and 88 which extend to respective storage fields 22 and [23] *33*, each of which comprises a number of single-transistor storage elements. In the figure, one single-transistor storage element 2 is illustrated as comprising a transistor 20 and a capacitor 23 which forms a part of the storage field 22, and in like manner, a storage element 3 is illustrated in the storage field 33 and comprises a single-transistor 32 and cooperable capacitor 30. The gate of the transistor 20 is connected by a wordline 21 to a decoder, not illustrated in the drawing, and in like manner, the gate of the transistor 32 is connected over a wordline 31 to a similar decoder, not illustrated. The recorded signal is stored in the respective storage elements in the form of a charge on the associated capacitor of the storage element.

Column 3 lines 24–58.

At the time t4, the charge of a storage element of the storage field 22 and 33 may pass as mentioned in U.S. Pat. No. 3,774,176 to the digit lines 77 and 88, respectively, and in dependence upon the sign of such charge, i.e. in dependence upon whether the data "0" or "1" reaches the digit line 77, 88, the existing potential on the digit line is increased or reduced. In the event that the potential is increased, i.e., in the given example the potential becomes more positive, such potential remains on the digit lines 77 and 88 since the barrier transistors 1 and 11 remain nonconductive. In the event that a negative charge is supplied to the digit lines 77, or 88, the potential prevailing on the digit line is temporarily reduced, since the barrier transistor 1, 11 temporarily becomes conductive. In accordance with the invention, a charge now flows from the point 7 [to] *or* the point 8 across the transistors 1 [,] *or* 11 until the orginally given potential is again reached on the digit line 77[,] *or* 88. This causes the potential of preferably 10V at the nodes 7 [and] *or* 8 to be reduced.

In accordance with the invention, in dependence upon the sign of the charge flowing to the digit lines 77, 88, as described above, a specific potential is set up across the nodes 7 and 8. If the potential on the digit line is increased, the potential prevailing across the nodes 7, 8 is retained, while if the potential is reduced, the potential at the nodes 7[,]or 8 likewise is reduced. Next, at the time t5, the flip-flop is again switched into its "on" state, for which purpose the potentials originally appearing at the inputs 9 and 10 prior to the time t1, are reconnected. The flip-flop of the regenerating circuit now lies in one of its stable operating points in dependence upon the data which is derived over the digit lines 77[,] *or* 88. At time t6, the transistor 1, 11 again become non-conductive.

Claims 1–7 are determined to be patentable as amended:

1. A regenerating circuit *system* in the form of a keyed *field-effect transistor* flip-flop for *"0" and "1" logic level* binary signals, in particular for the readout *of such binary logic* signals of integrated single-transistor storage elements forming a storage field in which the single-transistor storage elements are connected over a digit line to the flip-flop, characterized in that *first and second digit lines each with an associated digit line self-capacitance are provided and with each connecting to a group of storage elements and a respective dummy element; and wherein* the regenerating circuit comprises at least two inverting amplifier stages with feedback *connected between first and second nodes;* [, at least one barrier transistor disposed at the signal input between the associated digit line and the corresponding amplifier stage] *first and second barrier field effect transistors respectively connected at the first and second nodes so as to connect the respective first or second node with the respective associated first or second digit line* [,]*;* means for selectively effecting a discontinuance of the feedback function [and means for selectively adjusting bias potentials at the inputs of the regenerating circuit.] *of the flip-flop; first potential means connected for selectively setting a bias potential on the respective gates of the first and second barrier transistors; second potential means connected for precharging the digit lines and a node of self-capacitance of the flip-flop first and second nodes; and the first and second barrier transistors, the first and second potential means, and the means for discontinuance of the feedback function being provided such that after a selection of a storage element for reading of the stored binary signal therein the respective barrier transistor associated with the storage element signal level being readout forms a barrier for a portion of time thereby isolating the associated flip-flop node self-capacitance from the associated bit line self-capacitance, and so as to permit the flip-flop to assume a stable state corresponding to the binary signal being read when substantial feedback is initiated, said flip-flop action being used to refresh one of the logic level binary signals stored prior to readout over said same respective barrier transistor, a refresh path for said logic level binary signal being formed to extend from said associated node of the flip-flop over said barrier transistor to the readout storage element.*

2. A regenerating circuit *system* according to claim 1, wherein the means for discontinuing the feedback function comprises a voltage supply input operatively connected to the amplifier stages for selectively supplying operating voltage thereto.

3. A regenerating circuit *system* according to claim 1, wherein the *second potential* means [for providing bias potentials at the several inputs of the amplifier stages] comprises respective load transistors for the amplifier stages, the loan transistors being selectively controlled over a corresponding input of the regenerating circuit, whereby a relatively high bias may be supplied *for precharging the flip-flop nodes and digit lines.*

4. A regenerating circuit *system* according to claim 3, wherein the means for discontinuing the feedback function comprises a voltage supply input operatively connected to the amplifier stages for selectively supplying operating voltage thereto.

5. A regenerating circuit *system* according to claim 1, wherein [the means for providing bias potentials] at [the] signal inputs of the regenerating circuit [comprises] respective transistor[s] *means* controllable over corresponding inputs [, whereby] *are provided for applying* a relatively low bias [may be supplied] *to the digit lines.*

6. A regenerating circuit *system* according to claim 5, wherein the means for discontinuing the feedback function comprises a voltage supply input operatively connected to the amplifier stages for selectively supplying operating voltage thereto.

7. A regenerating circuit *system* according to claim 1, wherein the means for discontinuing the feedback *function* [and for providing a bias potential] comprises a field effect transistor having its source and drain terminals connected [to the nodes] *between outputs of the flip-flop* of the regenerating circuit and controlled over a corresponding input.

New claims 8–10 are added and determined to be patentable.

*8. The system of claim 1 wherein the respective barrier transistor, first and second potential means, and means for discontinuing the feedback function are provided such that for said one logic level binary signal for which refreshing occurs through the same barrier transistor, said barrier transistor conducts substantial charge so as to substantially change a potential of the bit line by the flip-flop action and refresh the storage element being read, and wherein for the other logic level binary signal substantially no charge flows across the barrier transistor.*

*9. The system of claim 1 wherein said first potential means applies a gate bias to a gate of said barrier transistor both before and during flip-flop action.*

*10. The system of claim 1 wherein said barrier transistor for a portion of time after selection of the storage element and prior to completion of the flip-flop action by its isolating action and resulting potential drop thereacross permits a substantial change of the node potential to exist relative to a simultaneous potential of the corresponding digit line for said one logic level binary signal.*

* * * * *